United States Patent [19]

Reeder et al.

[11] Patent Number: 4,501,615

[45] Date of Patent: Feb. 26, 1985

[54] ANTI-CORROSIVE PAINT

[75] Inventors: Frank Reeder, Whitburn; Michael J. Nunn; Michael J. Mitchell, both of Newcastle-upon-Tyne; Kenneth F. Baxter, Sunderland, all of England

[73] Assignee: International Paint Public Limited Company, London, England

[21] Appl. No.: 499,456

[22] Filed: May 31, 1983

[30] Foreign Application Priority Data

Jun. 1, 1982 [GB] United Kingdom ................. 8216000

[51] Int. Cl.$^3$ ........................ C23F 11/00; C04B 31/02
[52] U.S. Cl. ............................. 106/14.39; 106/14.12; 106/292; 106/299; 106/301; 106/304; 106/306; 106/308 R; 106/287.34; 524/121; 524/123; 148/6.15 R; 148/6.15 Z; 252/389 R
[58] Field of Search ............... 106/14.12, 14.21, 14.25, 106/14.33, 14.39, 292, 299, 301, 304, 306, 308 R, 287.34; 252/389.2, 389.21, 389.52, 389.53, 389.61; 148/6.15 R, 6.15 Z; 524/121, 123

[56] References Cited

U.S. PATENT DOCUMENTS

| | | | |
|---|---|---|---|
| 3,431,217 | 3/1969 | Hwa | 252/389 |
| 3,471,552 | 10/1969 | Budnick | 148/6.15 R |
| 3,483,133 | 12/1969 | Hatch et al. | 252/389 |
| 3,532,639 | 10/1970 | Hatch | 252/389 |
| 3,668,094 | 6/1972 | Hatch | 252/180 |
| 3,893,973 | 7/1975 | Rody et al. | 524/123 |
| 4,020,091 | 4/1977 | Budnick | 260/429.7 |
| 4,133,823 | 1/1979 | Joyce et al. | 524/123 |
| 4,137,184 | 1/1979 | Bakker | 252/389.52 |
| 4,217,216 | 8/1980 | Lipinski | 106/14.12 |
| 4,294,808 | 10/1981 | Wasel-Nulen et al. | 106/292 |

FOREIGN PATENT DOCUMENTS

| | | |
|---|---|---|
| 1201334 | 8/1970 | United Kingdom . |
| 1261554 | 1/1972 | United Kingdom . |
| 2072648 | 3/1981 | United Kingdom . |

Primary Examiner—John Kight
Assistant Examiner—Garnette D. Draper
Attorney, Agent, or Firm—Steele, Gould & Fried

[57] ABSTRACT

An anti-corrosive coating composition includes as an anti-corrosive pigment dispersed in a film-forming binder a salt of a polyvalent metal cation and an organic polyphosphonic acid containing at least 2 phosphonic acid groups. The ratio of polyvalent metal cations to phosphonate groups in the salt is at least 0.8/n:1, where n is the valency of the polyvalent metal ion.

13 Claims, No Drawings

ANTI-CORROSIVE PAINT

This invention relates to anti-corrosive coating compositions for use as a protective coating for metal surfaces, particularly on iron and steel to avoid rusting. Anti-corrosive coatings are, for example, applied to bridges, steel structures which are exposed to weather for long periods during the erection of buildings, car, aeroplane and other vehicle bodies and components, agricultural machinery, oil installations and exposed steel work on ships. An anti-corrosive coating (a "shop primer") may be applied to freshly blasted steel plate which is to be stored before use in construction or shipbuilding.

Anti-corrosive paint generally comprises a film-forming binder and one or more pigments. The pigments which have been regarded as most efficient in preventing corrosion are red lead and the chromates, particularly zinc chromate. Unfortunately both red lead and the chromates are now considered to be health hazards. Many anti-corrosive paints sold at present contain zinc phosphate as anti-corrosive pigment, but the performance of paints containing zinc phosphate has not been as good as those containing red lead or zinc chromate. The present invention seeks to provide a paint giving better protection of iron and steel from rusting than zinc phosphate paints and without using chemicals regarded as health hazards.

Many phosphates, phosphonates and polyphosphates have been used as corrosion and scale inhibitors in aqueous systems. Among these are hydroxy-ethylidene-1,1-diphosphonic acid, also known as etidronic acid, and its salts, whose use is described in British Pat. Nos. 1,201,334 and 1,261,554 and U.S. Pat. Nos. 3,431,217, 3,532,639 and 3,668,094, ethylene-1,1-diphosphonic acid described in British Pat. No. 1,261,554 and amino compounds substituted by two or more methylene phosphonic acid groups described in British Pat. No. 1,201,334 and U.S. Pat. No. 3,483,133. The preparation of an underbased lead salt of etidronic acid having a molar ratio of lead to etidronate of 0.5 (ratio of lead to phosphonate groups 0.25:1) is described in U.S. Pat. No. 4,020,091 and its use as a gelatinous pigment of high surface coverage power is described, although there is no mention of any anti-corrosive properties.

We have found that certain salts of organic polyphosphonates are particularly useful as anti-corrosive pigments.

An anti-corrosive coating composition according to the invention comprises a pigment component dispersed in a film-forming binder in which the pigment component comprises a salt comprising a polyvalent metal cation and an organic polyphosphonic acid containing at least two phosphonic acid groups, the molar ratio of polyvalent metal ions to phosphonate groups in the salt being at least 0.8/n:1, where n is the valency of the metal ion.

The corrosion inhibition achieved by anti-corrosive paints has several effects, whose relative importance can differ for different uses of the paint. One effect is inhibiting the appearance of rust and the brown staining caused by rust. This is particularly important when the anti-corrosive paint is used as a primer to be covered by a paint whose main purpose is cosmetic. Another effect is inhibiting loss of metal by corrosion, which is particularly important when coating ships or industrial steel structures. A third effect is inhibiting the formation of corrosion products at the surface of the metal which would reduce the adhesion of subsequent coats of paint. This is particularly important for a shop primer. Paints according to the invention can be prepared which are substantially more effective than paints containing phosphates, such as the known anti-corrosive pigment zinc phosphate, in achieving any one of these effects. the polyphosphonate salt pigment can be chosen to give a particular anti-corrosive effect, although many of the polyphosphonate salt pigments are superior to zinc phosphate in substantially all respects.

One type of preferred polyphosphonate salt conforms to the general formula:

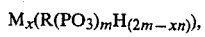

$M_x(R(PO_3)_m H_{(2m-xn)})$, where M represents a metal ion selected from zinc, manganese, magnesium, calcium, barium, aluminium, cobalt, iron, strontium, tin, zirconium, nickel, cadmium and titanium, R represents an organic radical linked to the phosphonate groups by carbon-phosphorus bonds, m is the valency of the radical R and is at least 2, n is the valency of the metal ion M and x is from $0.8m/n$ to $2m/n$.

The valency m of the organic radical R is preferably 2 to 5. The polyphosphonate may be derived from a diphosphonic acid $R(PO_3H_2)_2$, for example a hydroxyalkylidene-1,1-phosphonic acid of the formula:

where R' is a monovalent organic radical, preferably an alkyl group having 1 to 12 carbon atoms.

The polyphosphonate salt is preferably an etidronate since etidronic acid has the most phosphonate groups per unit weight of the acids of formula (I) and is available commercially. The acids of formula (I) can be readily prepared by reacting a carboxylic acid R'COOH with phosphorus trichloride and hydrolysing the reaction product.

An alternative type of polyphosphonic acid is an amino compound containing at least two N-methylenephosphonic acid groups. Such polyphosphonic acids can be prepared by the reaction of ammonia or an amine with formaldehyde and phosphorous acid. A diphosphonic acid of the formula:

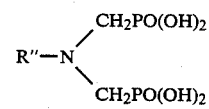

where R" is a monovalent organic radical, preferably a substituted or unsubstituted alkyl group having 1 to 12 carbon atoms such as propyl, isopropyl, butyl, hexyl or 2-hydroxyethyl, can be prepared from a primary amine. An example of a tri-phosphonic acid $R(PO_3H_2)_3$ is aminotris(methylene-phosphonic acid) $N(CH_2PO(OH)_2)_3$ prepared from ammonia. Examples of tetra-phosphonic acids $R(PO_3H_2)_4$ are alkylene diamine tetra(methylene-phosphonic acids) of the general formula:

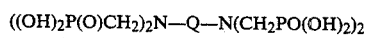

$((OH)_2P(O)CH_2)_2N-Q-N(CH_2PO(OH)_2)_2$ where Q is a divalent organic radical, preferably an alkylene group having 1 to 12 carbon atoms, for example ethylene diamine tetra(methylene-phosphonic acid) or hexamethylene diamine tetra(methylene-phosphonic acid). An alternative form of tetraphosphonic acid is an alkylene bis(1-hydroxymethyl-diphosphonic acid) of the formula:

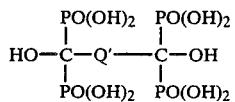

where Q' has the same definition as Q. Examples of pentaphosphonic acids $R(PO_3H_2)_5$ are dialkylene triamine penta(methylene-phosphonic acids), for example diethylene triamine penta(methylene-phosphonic acid) of the formula:

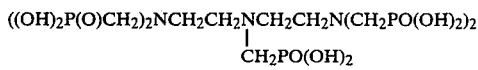

Polyphosphonic acids of higher functionality, including polymeric polyphosphonic acids, can be used, for example a polyethylene imine substituted by methylene phosphonic groups and having the formula:

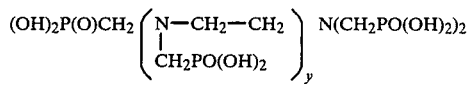

where y is at least 3.

The optimum ratio of polyvalent metal to acid in the salt may vary for different metals; for example we have found that zinc etidronate is most effective in preventing corrosion when the molar ratio of zinc to etidronate is at least 1.2:1, for example 1.4:1 to 2:1 (ratio of zinc to phosphonate groups at least 0.6:1, for example 0.7:1 to 1:1) whereas manganese etidronate is most effective at a manganese to etidronate molar ratio of 1:1 to 1.5:1 (ratio of manganese to phosphonate groups of 0.5:1 to 0.75:1). Within these ranges, salts having a lower polyvalent metal to acid ratio are generally most effective in preventing rust staining but the salts having a higher polyvalent metal to acid ratio allow least overall corrosion as assessed by absence of underfilm corrosion.

The complex polyphosphonate salt can be formed by reacting a basic compound of the desired metal M, for example an oxide, hydroxide or carbonate of zinc, manganese, magnesium, barium or calcium, with an organic polyphosphonic acid, for example etidronic acid, in the desired molar proportions.

The salt-forming reaction is preferably carried out in aqueous medium and the sparingly soluble salt is recovered as a precipitate. Examples of basic compounds are zinc oxide, calcium hydroxide and manganese carbonate. Mixtures of basic compounds, for example zinc oxide and calcium hydroxide, can be used to prepare a complex salt containing more than one metal M. An aqueous solution of organic polyphosphonic acid can be added to an aqueous slurry of the basic compound of vice versa. The slurry formed by the initial reaction of basic compound and acid of formula (I) may heated, for example at 50°-100° C. for 10 minutes to 24 hours, to ensure completion of the salt-forming reaction. The precipitated salt is then separated and dried; it is preferably washed with water before drying to remove any highly water-soluble material, particularly unreacted polyphosphonic acid.

Alternatively a soluble salt of the metal M can be reacted with the polyphosphonic acid or a soluble salt thereof, but care must be taken to wash the product free of any ion (such as chloride) which might promote corrosion.

The crystalline state of the complex salt varies according to the nature of the metal M, the polyphosphonate anion and the ratio of metal ion to polyphosphonate. Some metals form salts of well-defined crystalline form, whose stoichiometry and crystalline form may vary according to their method of preparation. Calcium etidronate, for example, forms two types of crystals with a calcium to etidronate ratio of 1:1, and florets of very small plate-like crystals with a calcium to etidronatte ratio of 2:1. When calcium hydroxide and etidronic acid are reacted in water at a molar ratio of 0.6:1–1.2:1 and at a temperature above 70° C. a precipitate of plate-like crystals of particle size below 50 microns is formed. When calcium hydroxide and etidronic acid are reacted at the same ratio in water at below 70° C. a precipitate of acicular crystals is formed. Both these crystal forms have been analysed as containing a molar ratio of calcium to etidronate between 0.9:1 and 1:1. The acicular crystals can be converted to the plate-like crystals by heating in water at above 70° C., for example for 30 minutes. Although both these calcium etidronates are effective corrosion inhibitors, the plate-like crystals are preferred because of their lower solubility in water (generally below 0.5 grams per liter) and lower particle size. Other metals tend to form precipitated salts whose crystalline form is less well-defined and whose composition varies according to the ratio of metal and etidronate used in their manufacture, with no identifiable compounds of simple stoichiometry. Zinc etidronate, for example, prepared from zinc and etidronic acid in molar ratio 1.5:1 under varying reaction conditions forms mainly agglomerated acicular crystals of overall zinc to etidronate ratio above 1.3:1 up to 1.6:1.

The polyphosphonate salt may alternatively be overbased. The metal used in an overbased polyphosphonate salt is preferably a metal whose oxide is not markedly alkaline, for example zinc or manganese. For example an etidronate of a metal such as zinc may have a molar ratio of metal to acid up to 3:1. Such overbased salts may be of the general form $M_zO_{(nz-2m)/2} R(PO_3)_m$, where M, R, m and n are defined as above and z is from 2m/n to 3m/n. They can be prepared by reacting an excess of a basic compound of the metal M, for example zinc oxide, with a polyphosphonic acid $R(PO_3)_mH_{2m}$, for example etidronic acid. In some cases overbased salts may be formed using an equivalent amount of basic metal compound and polyphosphonic acid. For example zinc oxide and etidronic acid reacted at a molar ratio of 2:1 can form an amorphous precipitate with a zinc to etidronate ratio in the range 2.3:1 to 2.7:1 together with fine plate-like crystals of zinc to etidronate ratio about 1.8:1. Both forms, or a mixture of them, are effective anti-corrosive pigments.

The polyphosphonate salt can also contain cations from a strong base such as sodium, potassium, ammonium or substituted ammonium cations derived from amines, including quaternary ammonium cations, particularly when the metal M is present in less than a stoichiometric amount. These neutralise some or all of the excess acid groups in the salt so that the salt is less acidic in contact with water. Substitution of strong base cations for free acid groups generally increases the solubility of the salt. Such salts containing strong base cations may be of the general formula:

$$M_xM'_yR(PO_3)_mH_{(2m-xn-y)}$$

where M, R, n, m and x are defined as above, M' is an alkali metal or an ammonium or substituted ammonium ion and the value of y is such that (xn+y) is from m to 2m. Salts of this type can be prepared by adding a strong base, for example sodium hydroxide, potassium hydroxide or a quaternary ammonium hydroxide such as tetrabutyl ammonium hydroxide to the slurry formed by reaction of a basic compound of polyvalent metal M with polyphosphonic acid $R(PO_3)_mH_{2m}$ or by reacting an aqueous solution of a partial alkali metal salt of a polyphosphonic acid of the general formula $$M'_yR(PO_3)_mH_{(2m-y)}$$

with the desired amount of the basic compound of metal M.

The invention includes coating compositions whose pigment component comprises salts containing both polyphosphate anions and other anions, for example phosphate anions, formed for example by coprecipitation.

The invention also includes coating compositions whose pigment component comprises particles of a substantially water-insoluble compound of a polyvalent metal reacted with an organic polyphosphoric acid so that the particles have a surface layer of metal polyphosphonate although the core of the particles may be unchanged water-insoluble metal compound. Pigments of this type may, for example, be formed by reacting an organic polyphosphonic acid with an excess of a metal oxide. The product may consist at least partly of coated oxide particles rather than a true overbased polyphosphonate salt. The metal oxide can, for example, be zinc oxide, tin oxide, iron oxide or a form of alumina, silica or zirconia having a proportion of hydroxyl groups at the surface of each particle. The particles of the water-insoluble metal compound used to make pigments of this type should preferably be less than 100 microns diameter, most preferably 1-20 microns.

The aqueous solubility of the polyphosphonate salt used as pigment is preferably not more than 2 grams per liter, for example 0.01-2 grams per liter. The preferred solubility for the salt may vary according to the intended use of the coating composition. Salts used in paints which continuously or frequently come into contact with water, for example metal primers for marine use, preferably have a solubility less than 0.6 grams per liter, for example 0.020-0.1 grams per liter. The solubility of the salt is less critical when it is used in paints which contact water less frequently, for example paints for use on cars, aircraft or land-based steel structures.

The film-forming binder for the anti-corrosive coating is preferably an organic polymer and can in general be any of those used in the paint industry, for example an alkyd resin, an epoxy resin, an oleresin, a chlorinated rubber, a vinyl resin, for example polyvinyl butyral, a polyurethane, a polyester, an organic or inorganic silicate, a polyamide or an acrylic polymer. Two or more compatible film-forming organic polymers can be used in paint. An extender resin such as a hydrocarbon resin or a coal tar derivative can be present. We have found that the polyphosphonate salts used according to the invention give particularly improved corrosion protection compared to known anti-corrosive pigments such as zinc phosphate when used in alkyd resins, which are the most widely used binders for protective coatings, and also give a marked improvement when used in epoxy resins.

The polyphosphonate salt is generally used as 2 to 100 percent by weight of the total pigment in the paint, preferably as 5 to 50 percent by weight of the total pigment.

The polyphosphonate salt can be used in conjunction with a known anti-corrosive pigment such as a phosphate, for example zinc phosphate, silicate, borate, diethyldithiocarbamate or lignosulphonate or zinc dust or with an organic anti-corrosive additive such as a tannin, oxazole, imidazole, triazole, lignin, phosphate ester or borate ester. Minor amounts of a basic pigment such as calcium carbonate or zinc oxide can be used, particularly if the polyphosphonate salt gives a pH less than 5 on contact with water. The calcium etidronates having a molar ratio of calcium to etidronate of about 1:1 generally give a pH of 4.5 to 5.1 on contact with water. Calcium etidronate with a molar ratio of calcium etidronate of about 2:1 gives an alkaline pH. Zinc etidronates having a molar ratio of zinc to etidronate of below about 1.4:1 generally give a pH of 3.5 or below. Zinc etidronates having a molar ratio of zinc to etidronate of above 1.6:1 generally give a pH of 6 to 7.

The coating composition of the invention can contain substantially inert pigments as well as the polyphosphonate salt, for example titanium dioxide, talc or barytes and optionally small amounts of coloured pigments such as phthalocyanines. The pigment volume concentration of the paint is preferably 20-50 percent depending upon the film-forming polymer used.

The coating compositions of the invention are most commonly used to prevent rusting of iron and steel but can also be used in anti-corrosive paints for metal surfaces other than iron, such as galvanised steel or aluminum, and can be used in pre-stressed concrete either to coat the stressing bars to prevent corrosion or as an exterior coating for the concrete to prevent rust staining.

The anti-corrosive coating is most usually applied to a metal surface by spray, roller or brush using as vehicle an organic solvent in which the film-forming binder is dissolved or dispersed. The coating may harden by evaporation of solvent, by air drying and/or by a cross-linking mechanism depending on the nature of the binder. The coating can alternatively be applied from an aqueous dispersion, in which case it can be applied by spray, roller or brush or by electro-deposition using a film-forming binder which is an anionic or cationic resin. Alternatively the coating composition can be applied as a powder coating, for example by electrostatic spray, and fused and cured on the metal surface.

The invention is illustrated by the following Examples:

EXAMPLES 1 TO 9

Preparation of Polyphosphonate Salts

EXAMPLE 1

184.8 grams (2.28 moles) zinc oxide was slurried at 20 percent by weight in water and heated to 70° C. An aqueous solution containing 316 grams (1.52 moles) etidronic acid was diluted to 20 percent by weight and heated to 70° C. The zinc oxide slurry was pumped into the etidronic acid solution over 45 minutes with continuous stirring of both the slurry and the solution. A precipitate formed after the addition of about 20 percent of the zinc oxide. The slurry formed was stirred for 4 hours at 60°–70° C. to allow the salt-forming reaction to take place. The slurry was then cooled and filtered on a Buchner funnel. The solid obtained was washed 4 times with distilled water using 2 liters of water each time to wash the salt free of etidronic acid. The wet filter cake was broken up and oven dried at 110° C. to obtain about 500 grams of zinc etidronate as a while solid with needle-like crystals. The solubility of the zinc etidronate was measured by slurrying it in distilled water, centrifuging and measuring the dissolved metal ion content. The metal ion content was 0.165 grams per liter, indicating a pigment solubility of 0.5 grams per liter.

EXAMPLE 2

Manganous carbonate (87.0 grams, 0.75 moles) was reacted with etidronic acid (154.0 grams, 0.75 moles) using the same procedure as in Example 1 to prepare manganese etidronate as a pink solid.

EXAMPLE 3

Calcium hydroxide (0.84 moles) was reacted with etidronic acid (1 mole) using the procedure of Example 1 to prepare calcium etidronate in the form of plate-like crystals.

EXAMPLE 4

80.7 grams (2.00 moles) magnesium oxide was reacted with 207.8 grams (1.01 moles) etidronic acid using the procedure of Example 1 to prepare magnesium etidronate as a white solid.

EXAMPLE 5

The preparation of Example 1 was repeated using 246.4 grams zinc oxide (3.04 moles) to prepare a zinc etidronate having theoretical zinc to etidronate molar ratio of 2:1.

EXAMPLE 6

The preparation of Example 1 was repeated using 369.6 grams zinc oxide (4.56 moles) to prepare a zinc etidronate having a theoretical zinc to etidronate molar ratio of 3:1.

The solubilities of the pigments of Examples 3 to 6 were as follows:

|  | Solubility in grams metal ion per liter | Solubility of pigment in grams per liter |
| --- | --- | --- |
| Calcium etidronate of Example 3 | 0.037 | 0.261 |
| Magnesium etidronate of Example 4 | 0.069 | 0.355 |
| Zinc etidronate of Example 5 | 0.045 | 0.114 |
| Zinc etidronate of Example 6 | 0.034 | 0.078 |

EXAMPLE 7

Manganous carbonate was added portionwise to a vigorously stirred solution of etidronic acid (78.0 grams, 0.38 mole) in 42 mls of distilled water. During the addition carbon dioxide was evolved and a purple solution was produced. After the addition of 39.6 grams of carbonate a tan coloured precipitate remained. Distilled water (500 ml) was added, followed by a further 47.4 grams of manganous carbonate to give a total of 0.75 mole. The mixture was stirred for ½ hour and then allowed to stand overnight. The resulting slurry was filtered, washed with distilled water and dried to give 115.3 grams of a pink solid, manganese etidronate.

EXAMPLE 8

Barium carbonate was added portionwise to stirred solution of etidronic acid (136.3 grams, 0.66 mole) in 1,584 mls of distilled water. A precipitate remained after the addition of 64.9 grams of the barium carbonate. A further 195.9 grams of barium carbonate was added, giving a total of 1.32 mole, and the stirred mixture was diluted with distilled water (1,500 ml).

The mixture was heated to 50°–55° C. for 1 hour, cooled, filtered and washed with distilled water. After drying at 110° C. a white solid weighing 313.7 grams was obtained.

The white solid was stirred in distilled water (1,000 ml) and 34.2 ml of concentrated hydrochloric acid was added. The mixture was stirred for 2½ hours, filtered, washed with distilled water and dried at 100° C. A white solid weighing 266.1 grams was obtained, barium etidronate.

EXAMPLE 9

A 20 percent aqueous solution of 316 grams etidronic acid was prepared as described in Example 1 and sodium hydroxide was added to it at a molar ratio of 1 mole sodium hydroxide to 2 moles etidronic acid to partially neutralise the acid. A 20 percent slurry of 184.8 grams zinc oxide in water was then reacted with the partially neutralised etidronic acid solution using the procedure of Example 1 to prepare a zinc etidronate modified by sodium ions.

EXAMPLES 1 TO 9

Paint Testing

The etidronates prepared as described in Examples 1 to 9 above were each used as the anti-corrosive pigment in an anti-corrosive paint. The etidronate was ball milled with the following ingredients until the particle size of the etidronate was 30–40 microns:

|  | Percent by Weight |
| --- | --- |
| Alkyd resin | 20.0 |
| Etidronate as prepared in one of the Examples 1 to 9 | 16.3 |
| Talc | 13.5 |

| | Percent by Weight |
|---|---|
| Titanium dioxide | 9.6 |
| Driers and additives | 2.4 |
| Solvent xylene | 38.2 |

Each anti-corrosive paint was sprayed onto steel panels at a dry film thickness of 100–200 microns. When the paint film was dry two scribes were scratched throught the paint film to reveal the underlying steel in the form of a cross. The panels were than subjected to 500 hours salt spray test as specified in British Standard BS 3900. In a comparative experiment paints were prepared having the formulation given above but using zinc phosphate (to British Standard BS 5193) in place of the etidronate.

After 500 hours in the salt spray test the panels were assessed with regard to blistering, rust spotting, corrosion in and around the scribe including under-film creep from the scribe and rust staining from the scribe. The paints of Examples 1 to 9 showed superior anti-corrosive performance compared to the paint containing zinc phosphate, particularly with regard to corrosion in and around the scribe and rust staining the the scribe. The panels coated with the paint of Examples 1, 2, 3, 5 and 9 showed less corrosion in all respect than the panels coated with the zinc phosphate paint. The panels coated with the paint of Example 6 showed less corrosion in and around the scribe than the panels coated with the zinc phosphate paint and were substantially equal to them in other respects. The panels coated with the paints of Examples 4, 7 and 8 showed less rust staining from the scribe than the panels coated with the zinc phosphate paint and were substantially equal to them in other respects.

EXAMPLE 10

1,177 grams calcium hydroxide was slurried in 4,695 grams water and the slurry was added at 130.5 grams per minute to a stirred solution of 3,913 grams etidronic acid in 15.55 Kg water in the temperature range 65°–78° C. A mass of matted needles was precipitated after 30 minutes and addition of the slurry was interrupted while these were dispersed and re-dissolved in the solution. As addition of the slurry was continued a precipitate of plate-like calcium etidronate crystals was formed. These were filtered, water washed and dried in a fluid bed dryer. Analysis of the product indicated a molar ratio of calcium to etidronate of 0.94:1.

The calcium etidronate so prepared can be used in the paint formulation of Example 3 with results at least as good as the paint of Example 3.

EXAMPLE 11

682 grams of a 60 percent aqueous solution of etidronic acid was added slowly to a stirred slurry of 400 grams zinc oxide in 1.45 Kg distilled water. A dense white amorphous precipitate was produced and settled when agitation had stopped to leave a clear liquor. The reaction was exothermic. The mixture was filtered and the precipitate was washed with distilled water and dried at 110° C. 863 grams of a zinc etidronate having a zinc to etidronate molar ratio of 2.4:1 was obtained.

As the filtered liquor cooled fine plate-like crystals were precipitated and these were filtered cold, washed and dried. 27.3 grams of a zinc etidronate having a zinc to etidronate molar ratio of 1.8:1 was obtained.

An anti-corrosive paint of 40 percent by volume solids was prepared based on a short oil alkyd resin having a pigment volume concentration (P.V.C.) of 40 percent with the above zinc etidronate (the main precipitate of zinc to etidronate molar ratio 2.4:1) used as 40 percent by volume of the pigment, the remaining pigment being titanium dioxide with a small amount of bentonite.

EXAMPLE 12

An anti-corrosive paint was prepared according to Example 11 but using the zinc etidronate as 80 percent by volume of the pigment.

EXAMPLE 13

A two-pack epoxy anti-corrosive paint was prepared from "Epikote 1001" (Trade Mark) epoxy resin and a pigment comprising 40 percent by volume of the zinc etidronate of Example 11 with titanium dioxide and a small amount of bentonite. The curing agent for the epoxy was a "Versamid" (Trade Mark) amino-functional polyamide and the overall solids content was 51 percent by volume and P.V.C. 40 percent.

EXAMPLE 14

A two-pack epoxy anti-corrosive paint was prepared according to Example 13 but using the zinc etidronate as 80 percent by volume of the pigment.

The anti-corrosive paints of each of Examples 11 to 14 were sprayed onto mild steel panels at a dry film thickness of about 100 microns and scribed and subjected to a salt spray test at 90° C. as specified in ASTM B-117. Similarly coated panels were subjected to a humidity test according to British Standard 3900F2 (100 percent relative humidity with temperatures cycled between 40° C. and 48° C. to ensure condensation).

As a comparison, paints containing zinc phosphate in place of zinc etidronate (samples 11 to 14) were prepared and tested.

The panels were assessed after 1,000 hours testing according to ASTM D-1654 (Procedure B). The results are shown in the following Table 1. The panel is assessed according to the percentage of the area showing any corrosion failure or blistering and rated accordingly. The film is then pared back with a scalpel to assess whether there is underfilm corrosion, with is graded as

TABLE 1

| | HOT SALT SPRAY TEST | | | HUMIDITY TEST | | |
|---|---|---|---|---|---|---|
| Panel Reference | % area failed | Rating Number | Underfilm<br>x = heavy corrosion<br>+ = medium corrosion<br>o = no corrosion | % area failed | Rating Number | Underfilm<br>x = heavy corrosion<br>+ = medium corrosion<br>o = no corrosion |
| Example 11 | 30 | 4 | o | 3 | 8 | + |
| Example 12 | 6 | 7 | o | 1 | 10 | + |
| Sample 11A | 37 | 3 | + | 100 | 0 | + |
| Sample 12A | 46 | 2 | + | 100 | 0 | + |
| Example 13 | 100 | 0 | + | 0 | 10 | o |

TABLE 1-continued

| | HOT SALT SPRAY TEST | | | HUMIDITY TEST | | |
|---|---|---|---|---|---|---|
| Panel Reference | % area failed | Rating Number | Underfilm x = heavy corrosion + = medium corrosion o = no corrosion | % area failed | Rating Number | Underfilm x = heavy corrosion + = medium corrosion o = no corrosion |
| Example 14 | 93 | 0 | o | 0 | 10 | o |
| Sample 13A | 100 | 0 | o | 0 | 10 | + |
| Sample 14A | 100 | 0 | o | 0 | 10 | o | x — heavy corrosion
+ — moderate corrosion
o — no corrosion.

The paints containing zinc etidronate showed substantially less corrosion in both the hot salt spray and humidity tests, both in terms of visible corrosion and underfilm corrosion.

EXAMPLE 15

400 grams of a 50 percent by weight solution of amino tri(methylene phosphonic acid) was diluted with distilled water to give a 20 percent by weight solution and heated to 75°–80° C. A 20 percent by weight slurry of 99.0 grams calcium hydroxide in distilled water was heated to 75°–80° C. and added to the phosphonic acid solution over 45 minutes with continual stirring. The molar ratio of calcium hydroxide to amino tri(methylene phosphonic acid) was 2:1 (ratio of calcium to phosphonic groups 0.67:1). Following complete addition of the slurry, the solution and the resultant precipitate was held at temperature and stirred for a further two hours. The precipitate was isolated and dried.

EXAMPLES 16 TO 23

Calcium and zinc salts of various organic polyphosphonic acids were made by the procedure of Example 15 as set out in the following Table 2:

TABLE 2

| Example No. | Type of Polyphosphonic Acid | Weight of Polyphosphonic acid | Weight of Ca(OH)2 | Weight of ZnO | Molar Ratio of Ca or Zn to poly-phosphonic acid | Ratio of Ca or Zn to phosphonic Groups |
|---|---|---|---|---|---|---|
| 16 | Amino tri (methylene phosphonic acid) | 58.5 g | 41.7 g | — | 2.88:1 | 0.96:1 |
| 17 | Amino tri (methylene phosphonic acid) | 95.5 g | — | 48.6 g | 1.88:1 | 0.63:1 |
| 18 | Amino tri (methylene phosphonic acid) | 81.0 g | — | 68.0 g | 3.10:1 | 1.03:1 |
| 19 | Ethylene diamine tetra (methylene phosphonic acid) | 81.8 g | 50.0 g | — | 4.0:1 | 1.00:1 |
| 20 | Ethylene diamine tetra (methylene phosphonic acid) | 81.8 g | — | 54.7 g | 4.0:1 | 1.00:1 |
| 21 | Hexamethylene diamine tetra (methylene phosphonic acid) | 92.3 g | 53.9 g | — | 4.0:1 | 1.00:1 |
| 22 | Hexamethylene diamine tetra (methylene phosphonic acid) | 92.3 g | — | 59.0 g | 4.0:1 | 1.00:1 |
| 23 | Diethylenetriamine penta (methylene phosphonic acid) | 172.6 g | — | 66.5 g | 5.45:1 | 1.09:1 |

Each of the polyphosphonate salts prepared in Examples 15 to 23 can be used in place of calcium etidronate in the paint formulation of Example 3 to give a paint of anti-corrosive properties equal to those of the paint of Example 3.

EXAMPLE 24

1 mole sodium hydroxide was added to 1 mole etidronic acid in aqueous solution to provide a 20 percent by weight solution. 1 mole of an aqueous slurry of calcium hydroxide was added over 30 minutes to produce a precipitate of a calcium sodium etidronate which was filtered, washed and dried. This polyphosphonate salt could be used in place of calcium etidronate in the paint formulation of Example 3 to give a paint of equal anti-corrosive properties.

What is claimed is:

1. An anti-corrosive coating composition comprising a pigment component dispersed in a film-forming binder, in which the pigment component comprises a salt of an organic polyphosphonic acid containing at least two phosphonic acid groups and a polyvalent metal cation selected from the group consisting of zinc, manganese, magnesium, calcium, barium, aluminum, cobalt, iron, strontium, tin, zirconium, nickel, cadmium and titanium, the molar ratio of polyvalent metal cations to phosphonate groups in the salt being at least 0.8/n:1, where n is the valency of the metal cation, and the aqueous solubility of the polyphosphonate salt being 0.1-2 grams per liter, and the film-forming binder is selected from a group consisting of alkyd resin, epoxy resin, oleoresin, chlorinated rubber, polyvinyl butyral, polyurethane, polyester, organic silicate, inorganic silicate, polyamide and acrylic polymer.

2. An anti-corrosive coating composition according to claim 1 in which the salt is of the general formula $M_xR(PO_3)_mH_{(2m-xn)}$, where M represents the said metal cation, R represents an organic radical linked to the phosphonate groups by carbon-phosphorus bonds, m is the valency of the radical R and is at least 2, n is the valency of the metal ion M and x is from 0.8m/n to 2m/n.

3. An anti-corrosive coating composition according to claim 2 in which the salt is a salt of a diphosphonic acid of the formula:

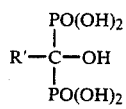

where R' is a monovalent organic radical.

4. An anti-corrosive coating composition according to claim 3 in which the salt is a salt of etidronic acid.

5. An anti-corrosive coating composition according to claim 2 in which the salt is a salt of an amino compound containing at least two N-methylene-phosphonic acid groups.

6. An anti-corrosive composition according to claim 1 in which the salt is a zinc salt.

7. An anti-corrosive coating composition according to claim 1 in which the salt is a manganese salt.

8. An anti-corrosive coating composition according to claim 1 in which the salt is a calcium salt.

9. An anti-corrosive coating composition according to claim 8 in which the salt is a calcium etidronate having a molar ratio of calcium to etidronate groups of about 1:1 and being predominantly in the form of plate-like crystals.

10. An anti-corrosive coating composition according to claim 1 in which the salt is of the general formula:

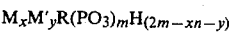

where M, R, n, m and x are all as defined in claim 2, M' is an alkali metal ion or an ammonium or substituted ammonium ion, and the value of y is such that (xn+y) is from m to 2m.

11. An anti-corrosive coating composition according to claim 1 in which the salt is an overbased salt.

12. An anti-corrosive coating composition according to claim 11 in which the salt is a zinc etidronate having a molar ratio of zinc to etidronate groups of from 2:1 to 3:1.

13. An anti-corrosive coating composition according to claim 1 in which the salt is in the form of composite particles formed by precipitating the polyphosphonate salt on the surface of particles of a metal oxide.

* * * * *